A. L. MURRAY.
REINFORCEMENT FOR PNEUMATIC TIRES.
APPLICATION FILED DEC. 28, 1912.
1,130,424.
Patented Mar. 2, 1915.
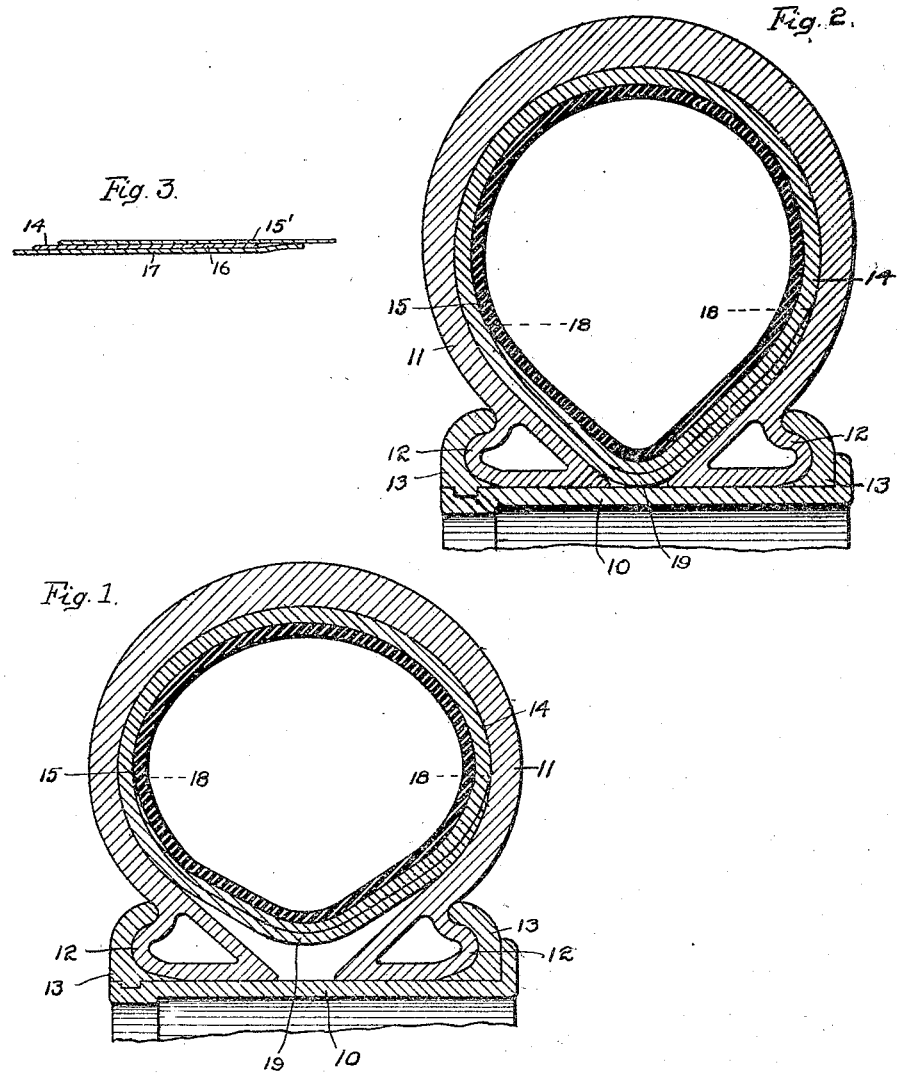
WITNESSES
H. J. Kiess
Isaac K. Taylor
INVENTOR
Albert Linn Murray
BY
Taylor & Hulse
ATTORNEYS.

UNITED STATES PATENT OFFICE.

ALBERT LINN MURRAY, OF AUBURN, INDIANA.

REINFORCEMENT FOR PNEUMATIC TIRES.

1,130,424.　　　　Specification of Letters Patent.　　Patented Mar. 2, 1915.

Application filed December 28, 1912. Serial No. 738,971.

*To all whom it may concern:*

Be it known that I, ALBERT LINN MURRAY, a citizen of the United States, residing at Auburn, in the county of Dekalb and State of Indiana, have invented new and useful Improvements in Reinforcements for Pneumatic Tires, of which the following is a specification.

My invention relates to reinforcements for pneumatic tires and particularly to inner reinforcements for the outer casings of such tires.

The object of my invention is to provide an inner reinforcement for pneumatic tires which shall take part of the strain off the outer casing of the tire and thereby increase the life and durability of the casing.

In the use of a reinforcement in a tire the production of heat by friction between the surfaces of the casing and the reinforcement must be guarded against. I have found the material best suited for the structure of the reinforcement to be the same material as the rubberized fabric body out of which the casing is made—that is, several plies of cotton fabric impregnated with rubber and joined by vulcanization. Such material in a reinforcement is capable of withstanding the same amount of flexing which is required of the casing. In order that frictional heat and chafing between the casing and reinforcement shall be obviated I have found that the reinforcement should be of a very flexible nature in order that the air pressure within the tire may hold the reinforcement so firmly against the wall of the tire that the flexing operation will take place principally within the fabric body of the reinforcement. In accomplishing this result I have found that the reinforcement should be somewhat lighter or thinner than the regular body of fabric used in the tire casing. For example, where a tire casing is composed of five plies of 17½ oz. fabric, a reinforcement formed of the same number of plies of the same weight material will exert more resistance against the flexing of the reinforcement than the air under pressure in the inner tube can overcome; consequently relative movement between the casing and reinforcement takes place. It follows that such a reinforcement will heat or chafe badly. However, if the reinforcement is formed of five plies of a lighter weight of material than that of the casing, or of about three plies of the same weight of material, the inner tube pressure is sufficient to prevent relative motion between the reinforcement and casing by causing this motion to take place within the structure of the reinforcement.

Since the reinforcement is, preferably, thinner than the casing, it has not the full strength of the casing and consequently the durability of the reinforcement would be greatly decreased should it become locked in such a manner as to make a cross section of it smaller at any point than the size necessary to meet the inside walls of the casing and rim. Both the outer casing and the reinforcement, however, will become very durable if the reinforcement is only required to assist or relieve the casing and thereby prevent either the casing or the reinforcement from receiving the full strain of the air pressure in the inner tube alone at any point. Should the outer casing break at any point, the reinforcement has sufficient strength to hold the pressure of the inner tube temporarily, thereby preventing a blowout and the necessity of changing tires along the road.

It is obvious that a reinforcement should not interfere with nor increase the labor or effort required in the placing of a tire on the wheel rim, as that operation is usually performed. It is also desirable that the reinforcement should be adjustable to such variations of tire sizes as occur in tires of different manufacture, and also that it may accommodate itself to a new and unstretched tire and to one which is old or fully stretched by use.

The best manner of accomplishing the above requirements is to form the reinforcement with an opening along its inner periphery so that the inner tube may be readily inserted. The open edges of the reinforcement overlap and are so formed that they will interlock or become immovable against further extension when the tire is fully inflated with air.

Heretofore tire reinforcements have been made in which the overlapping edges have been serrated, or are provided with other forms of interlocking elements. But such constructions are defective because the serrations or interlocking parts engage each other when the casing is placed on the rim.

Consequently, the engaging parts become relatively immovable on the application of the first light air pressure to the tube with the result that all the air pressure strains, where the tire is fully inflated, are exerted upon the circle formed by the reinforcement, and the reinforcement itself will burst or tear apart within a much shorter time than the ordinary life of the tire.

By my invention I have overcome the difficulties encountered heretofore in the use of tire reinforcements and provide a reinforcement which has all the advantages above described.

In the drawings I have illustrated the preferred form in which my invention may be carried out in practice, in which—

Figure 1 is a transverse section of a deflated tire mounted on a rim, the reinforcement constructed according to my invention being shown. Fig. 2 is a transverse section of the same, showing the position of the parts when the tire is inflated, and Fig. 3 is an enlarged section of the reinforcement.

Referring to the drawings, 10 is the rim of a wheel of any well known form; 11 is the outer casing of the tire of any well known form having its beads 12 in engagement with the rings 13 on the rim. Within the casing is the reinforcement 14 and within the reinforcement is the inner tube 15. The reinforcement is formed of a plurality of plies of fabric which are impregnated with rubber and vulcanized together similarly to the plies of the casing, but the fabric body of the reinforcement is composed of cotton duck less in thickness than that of the casing. It is provided with an opening which extends entirely around its inner periphery and the reinforcement is of sufficient width to insure the continuous contact of the overlapping portions whether the tire is inflated or deflated. The reinforcement adjacent each open edge is beveled or tapered so that the edge of the fabric body is of considerable thinness, preferably of no greater thickness than one of the plies of rubberized fabric of the reinforcement.

In Fig. 3 I show the reinforcement formed of three plies, although there may be any suitable number of such plies in the entire body of the reinforcement or at any desired point or points thereon. The ply 15′, which, in the assembled tire preferably makes contact with the inner tube, is wider than the others; that is, it extends to the open edges of the reinforcement. The middle ply 16 is somewhat shorter than ply 15′ and ply 17 overlaps the edge of ply 16 and is joined to ply 15′ but does not extend to the edge of ply 15′. The outer surface of ply 17 therefore produces a beveled effect near the open edge of the reinforcement. The beveled surface on the reinforcement may be produced in any convenient manner, that shown in the drawing being only one such manner of producing such a surface. The beveled portions of the reinforcement materially aid in the sliding of the overlapping portions of the reinforcement as the tire is inflated and when the tire is fully inflated said surfaces assist in securing the reinforcement in place by gripping the adjacent inside surface of the casing and the inner surface of the reinforcement. The said beveled surfaces by virtue of their gripping effect will necessarily tend to retard the expansion of the reinforcement especially when the tire is fully inflated with air, since the thin beveled edge of the outer flap is bound tightly between the casing and reinforcement by the air under pressure in the inner tube.

In Fig. 1 the tire is deflated. The overlapping portions of the reinforcement are slid upon each other to such extent that the reinforcement is considerably smaller than the inner wall of the casing, the edges of the reinforcement being indicated by numerals 18, 18. The casing may, therefore, be readily placed on the rim. As the inner tube is inflated the overlapping portions slide on each other to extend the reinforcement to meet the inner wall of the casing, and when the inflation is complete the edges 18 of the reinforcement will assume a position approaching that shown in Fig. 2. In this position the central part 19 of the overlapping portions between the beads 12 is curved sharply to meet the contour of the beads 12 and to conform to the contour of the beads 12. This sharply curved portion together with the grip of the beveled edges of the reinforcement locks the reinforcement to the casing and since the air pressure in the tube is the same in all directions, the overlapping portions cannot further slide because it will require more power to pull the sharply curved portion 19 around the curve than is required to hold it in place. The reinforcement is therefore automatically locked to the casing when the inflation of the tire is complete and heat by friction and by chafing are obviated in the tire, and the reinforcement is compelled to divide with the casing the strain of the air under pressure in the inner tube and all the external strains placed on the tire while it is in use.

I contemplate forming the reinforcement of various thicknesses and in various lengths and hence do not wish to be limited to the precise thickness or form herein described. It will be seen that the beveled edges of the reinforcement, when the reinforcement is placed in the tire, are at all times above the inner edges of the tire or toes of the beads.

What I claim is:

An inner reinforcement for pneumatic tires having overlapping portions along its inner periphery, the edges of which portions are beveled and extend, in use, above the beads of the tire, said portions being adapted to slide upon each other as the tire is inflated to cause the reinforcement to conform to the inner wall of the tire and to the outer surface of the wheel rim between the beads and lock the same within the tire.

In witness whereof I hereunto sign my name this 21st day of December, 1912.

ALBERT LINN MURRAY.

Witnesses:
A. E. HOLDEN,
J. C. LOCHNER.